Figure 1:
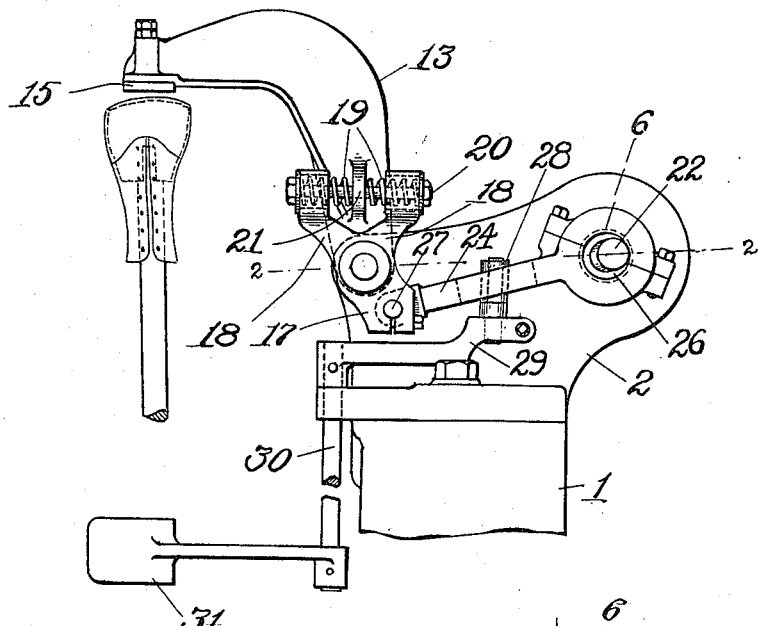

F. M. FURBER.
MECHANICAL MOVEMENT.
APPLICATION FILED JULY 10, 1911.

1,181,659.

Patented May 2, 1916.

UNITED STATES PATENT OFFICE.

FREDERICK M. FURBER, OF REVERE, MASSACHUSETTS, ASSIGNOR TO UNITED SHOE MACHINERY COMPANY, OF PATERSON, NEW JERSEY, A CORPORATION OF NEW JERSEY.

MECHANICAL MOVEMENT.

1,181,659.  Specification of Letters Patent.  Patented May 2, 1916.

Application filed July 10, 1911. Serial No. 637,587.

*To all whom it may concern:*

Be it known that I, FREDERICK M. FURBER, a citizen of the United States, residing at Revere, in the county of Suffolk and State of Massachusetts, have invented certain Improvements in Mechanical Movements, of which the following description, in connection with the accompanying drawings, is a specification, like reference characters on the drawings indicating like parts in the several figures.

This invention relates to driving and variable controlling mechanism for beating and other similar machines and is herein shown as embodied in a shoe beating machine of the type illustrated in a British Patent No. 18883/04.

The invention has for its object to provide improved actuating means for the beater.

An important feature of the invention consists in the novel combinations with a beater or other device to be reciprocated and a driven shaft, of a member extending from the shaft in a direction oblique to the shaft axis and a connector extending from said member to the beater and adjustable along said member to vary the stroke imparted to the beater.

The several features of the invention will more fully appear in connection with the following description of the illustrated embodiment thereof and will then be pointed out in the claims.

Figure 2:
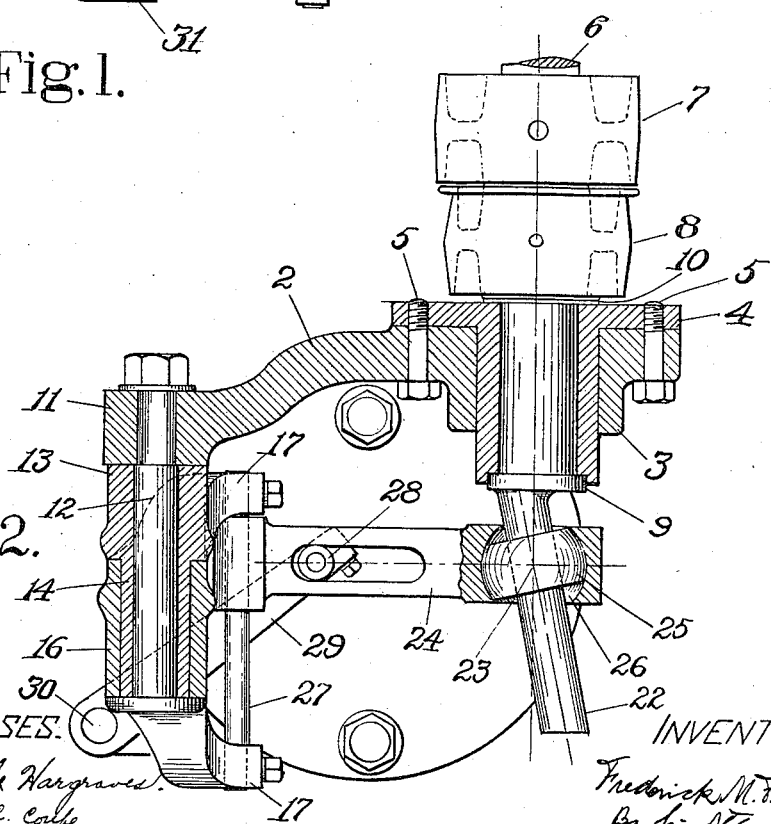

Figure 1 of the drawings is a side elevation and Fig. 2 is a section on line 2—2 of Fig. 1.

A column 1 provides support for a bracket 2 in which is a bearing 3 having secured therein the bushing 4 by means of bolts 5. This bushing provides a substantially long bearing for a driven shaft 6 on one end of which is mounted tight and loose pulleys 7 and 8, respectively. The portion of the shaft 6 resting in the bushing is provided with shoulders 9 and 10 to restrain the shaft from endwise movement. The bracket 2 provides a boss 11 in which is secured the stud 12. Upon this stud the arm 13 is mounted by means of the elongated bearing 14 for oscillatory movement, and carries the beating tool 15. On the elongated bearing 14 is fulcrumed a lever 16 having depending arms 17. Upper arms 18 of this lever contain seats for springs 19 and are connected by a rod 20 which extends through an ear 21 on the arm 13 and forms a guide for the springs 19 which are arranged to transmit the movement yieldingly from the lever 16 to the arm 13.

At the end of the driving shaft opposite the pulleys is an obliquely extended rod 22. This rod at its junction with the shaft proper is preferably offset as shown in Fig. 2. This provides that the intersection 23 of its axis with the axis of the shaft may be at a point sufficiently removed from the end of the shaft proper to permit a connecting bar 24 to be centrally connected at that point. This connection is provided by means of a slabbed ball 25 which is slidably mounted on oblique rod 22 and seated in a socket 26 in the bar 24. The opposite end of connecting bar 24 is slidably mounted on rod 27 which is supported by depending arms 17. The bar 24 is slotted to receive pin 28 mounted on arm 29 of a rock-shaft 30 having a knee lever arm 31.

In operation the driven shaft 6 imparts motion to the oblique rod 22, causing it to move so that its axis generates the surface of an imaginary cone, the apex of which is at the point of intersection 23 of the axis of the driven shaft 6 and the axis of the oblique rod 22. The inertia of bar 24 and the beating mechanism connected therewith causes it to maintain itself in that relatively transverse position of rod 27 and oblique rod 22 in which the rotation of rod 22 is inoperative to actuate the beating mechanism. The position here referred to is that position (see Fig. 2) of bar 24 on the oblique rod 22 in which the rotation of rod 22 has no eccentric action, due to the inclination of its axis to the axis of its rotation, on link 24, or when the link is centrally located transversely of the oblique rod 22 at the point of departure of the axis of rod 22 from the axis of its rotation.

By movement of the knee lever 31, the bar 24 may be moved along rod 27 and oblique rod 22, and maintained throughout this movement in transverse relation thereto under the influence of the preferably long bearing at its end, and thus bring the ball and socket joint 25 and 26 to a position on the rod 22 in which longitudinal reciprocation of bar 24 will be imparted by oblique driver rod 22. The movement of the bar 24 along rod 27 and oblique driver rod 22 to vary desirably the eccentric relation of driven shaft 6 and ball and socket 25 and 26 and proportionally the stroke of the beating tool may be effected while the oblique driver rod is still in motion.

By means of the rod 27 secured in arms 17, reciprocation of bar 24 transmits to lever 16 a rocking or oscillatory motion about the elongated bearing 14. This rocking motion of lever 16 is transmitted yieldingly to arm 13 by means of the springs 19 co-acting with ear 21 formed on arm 13. As the axis of rod 22 moves in the surface of an imaginary cone the sliding of the lever 24 to different transverse positions of rod 22 will cause the ball and socket joint 25 and 26 to operate in planes which are relatively different right sections of this imaginary cone. It will be seen, further, that movement by the bar 24 of the ball and socket joint away from the point 23 or apex of the cone causes the ball and socket joint to act through circles which are the peripheries of right sections of the cone. It will also be seen that the diameters of these circles increase in proportion to the distance that the bar 24 moves the ball and socket joint 25 and 26 from the point of intersection 23. In order to increase or decrease the throw of the bar 24 and consequently the stroke of beating tool 23, it is therefore simply necessary to move bar 24 by means of knee lever 31 along the rods 27 and 22. Then the motion imparted to rod 27 will equal in extent the diameter of the right section of the imaginary cone through which the ball and socket joint 25 and 26 is made to operate.

Having described my invention, what I claim as new and desire to secure by Letters Patent of the United States is:—

1. Apparatus of the class described, having, in combination, a support, a driving shaft having a long bearing thereon, driving pulleys on the shaft at one end of said bearing, a head on the shaft at the other end of said bearing, said shaft being confined against endwise movement in the bearing between the head and pulleys, a crank arm attached to the head eccentrically with relation to the axis of the shaft and extending obliquely across the axis of the shaft to provide a neutral or non-driving point adjacent to the shaft bearing and an operative driving portion more remote from the bearing, a rocker to be driven from the crank arm, and a driving connection adjustable along said crank arm and rocker.

2. Apparatus of the class described having, in combination, a support, a shaft journaled and confined against endwise movement therein, means for driving the shaft, an oblique crank arm on the shaft, a rocker to be driven from the crank arm, a laterally sliding driver having a long bearing hub connection with the rocker and a swiveling connection with the crank arm, and a two-arm rock-shaft having one arm connected to said driver and a knee fork on the other arm for sliding the driver along the crank arm and the rocker and maintaining it in position to secure the desired length of rocking motion from the crank arm.

3. Apparatus of the class described having, in combination, a member to be driven, a shaft, a driver extending from the end of the shaft obliquely with relation to the axis of the shaft, a bar for transmitting movement to the member having a sliding connection with the member and a swiveled connection with said driver and capable of right line sliding adjustment along its connection with the member and along said driver into positions of different eccentricity with relation to the shaft, and means adapted for operation during the operation of the machine for so sliding the bar to vary the actuation of the driven member.

In testimony whereof I have signed my name to this specification in the presence of two subscribing witnesses.

FREDERICK M. FURBER.

Witnesses:
  CHESTER E. ROGERS,
  LESTER A. STOWE.

Copies of this patent may be obtained for five cents each, by addressing the "Commissioner of Patents, Washington, D. C."